Patented Feb. 24, 1942

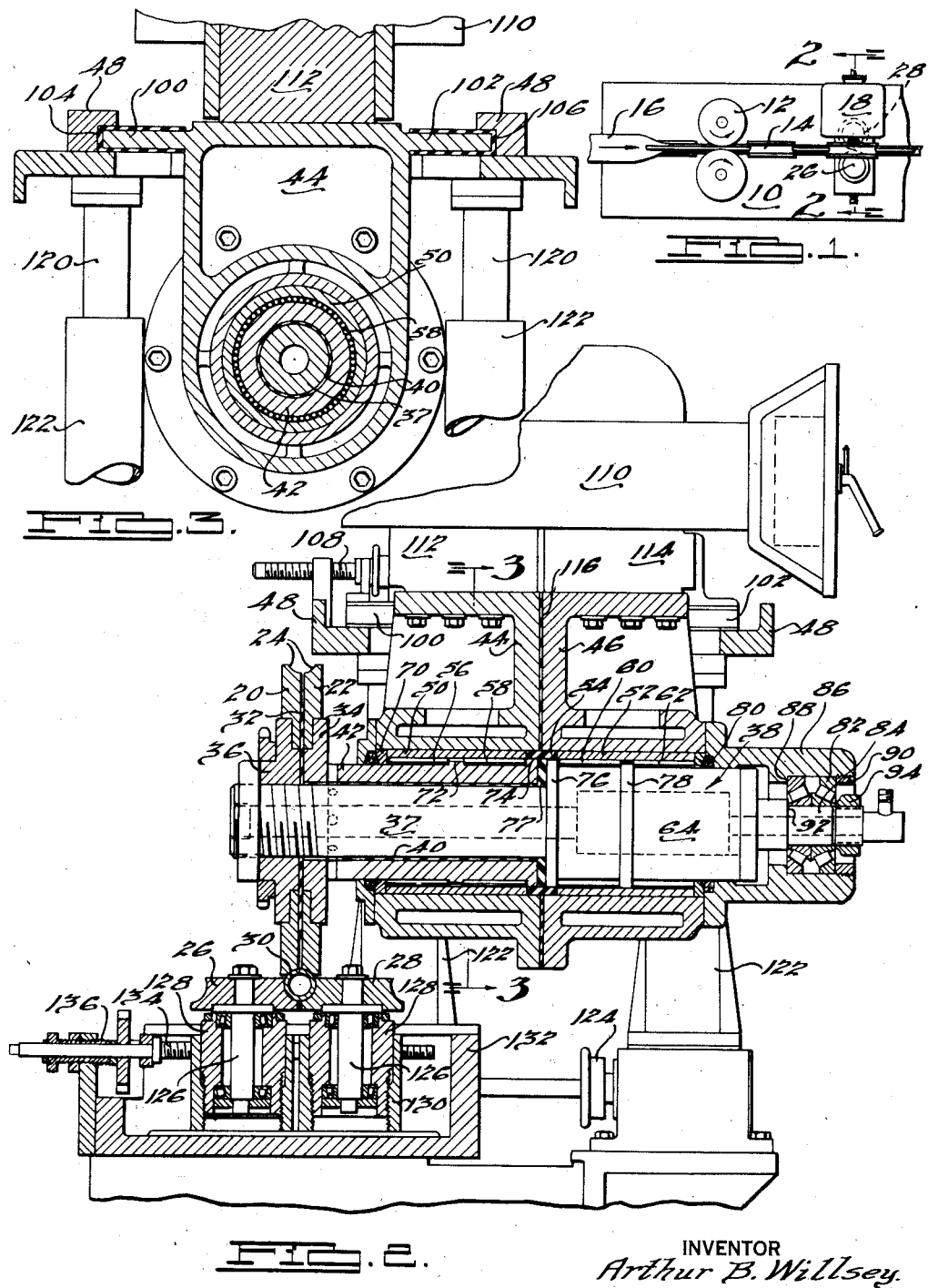

2,274,514

UNITED STATES PATENT OFFICE 2,274,514

WELDING MECHANISM

Arthur B. Willsey, Dearborn, Mich.

Application October 4, 1940, Serial No. 359,752

9 Claims. (Cl. 219—6)

The present invention relates to current controlling apparatus, and in particular is directed to the provision of an improved welding head for use in the electric welding of tubing.

The principal objects of the present invention are to provide an improved structure for transmitting current between relatively stationary and moving parts; to provide such a structure wherein a rotatable bearing between the stationary and moving parts is applied as the current conducting member; to provide such a construction wherein the current is transmitted directly between the two bearing elements by a plurality of elongated rollers of relatively small diameter, interposed between the bearing surfaces; to provide such a construction embodying improved means for maintaining the individual bearing elements in substantial alignment with each other; and to provide a current conducting bearing of the above-indicated character, which is simple in construction, economical of manufacture, and which is exceedingly reliable and efficient in operation.

Further objects of the present invention are to provide an improved welding head for welding machines embodying an improved current conducting bearing of the above-indicated type; to provide such a construction embodying an improved spindle construction having two portions insulated from each other, each portion constituting one terminal of the welding circuit; and to generally improve the construction and arrangement of welding heads.

With the above, as well as other and more detailed objects in view, which appear in the following description and in the appended claims, a preferred but illustrative embodiment of the invention is shown in the accompanying drawing, throughout the several views of which corresponding reference characters are used to designate corresponding parts and in which:

Figure 1 is a diagrammatic view in top plan of a welding machine embodying the present improvements;

Fig. 2 is a view in transverse vertical section, taken along the line 2—2 of Fig. 1; and, Fig. 3 is a view in section, taken along the line 3—3 of Fig. 2.

It will be appreciated from a complete understanding of the present invention that certain of the improvements thereof may be embodied in structures intended for widely differing purposes and having widely different structural arrangements. In their preferred embodiment, however, the present improvements are incorporated in an improved welding head for use in connection with the welding of tubing by the use of alternating current, and the improvements are so illustrated herein.

Referring particularly to Fig. 1, a generally conventional tube forming machine, of the type to which the present welding head may be applied, may comprise a frame structure 10, having mounted thereon a plurality of pairs of tube forming rollers such as are designated at 12 and 14, between which the flat strip 16 is drawn from a suitable reel (not shown) and which act to deform the strip from its initial flat condition into generally cylindrical form. In accordance with conventional practice, the thus partially formed tubing, having the mating edges of the seam cleft positioned in slightly spaced relation, is moved past an electric welding head, which acts to force the mating edges into solid abutting engagement with each other and passes a current across the adjacent seam edges, thereby heating the same and forming a weld therebetween. The present improved welding head is designated as a whole as 18 in Fig. 1, and is shown in more detail in Figs. 2 and 3.

Referring particularly to Figs. 2 and 3, the present welding head comprises generally a pair of roller electrodes 20 and 22, the peripheries whereof are complementarily grooved, as is indicated at 24, for direct engagement with the surface of the tube. Adjacent the welding head, the welding machine is provided with the rollers 26 and 28, which act to give vertical and lateral support to the tube, and, passing through the welding throat defined by the rollers 26 and 28 and the electrodes 20 and 22, the cleft between the mating edges of the tube is entirely closed, bringing the tube into the cylindrical form indicated at 30 in Fig. 2.

The electrodes 20 and 22 are arranged in back-to-back relation, with a separating disc 32 of insulating material interposed therebetween, and are rigidly secured together between the bushings 34 and 36. The bushing 34 is fitted over a sleeve 40 of insulating material, which surrounds the spindle 38, and the inner face of the bushing 34 directly abuts the outer end of a sleeve 42, which is press fitted over the insulating sleeve 40. The bushing 36 is threaded onto the reduced outer end 37 of the spindle 38, and in the assembled position of the parts, solidly clamps the electrodes 20 and 22 between the bushings 36 and 34. Any suitable means may, of course, be employed to lock the bushing 36 in assembled position on the spindle 38.

The spindle assembly, comprising the spindle 38 and the sleeve 42, is rotatably journaled in bearing openings provided in a pair of laterally spaced hangers 44 and 46, which depend from and are directly supported by a main frame 48. More particularly, the bearing openings in the hangers 44 and 46 are provided, respectively, with bearing sleeves 50 and 52, which sleeves are insulatingly separated by a ring 54 of insulating material.

In accordance with the present invention, a plurality of sets 56 and 58 of rollers are interposed between the sleeve 42 and the corresponding bearing sleeve 50. A similar pair of sets of rollers 60 and 62 are interposed between the enlarged righthand end 64 of the spindle 38 and the corresponding sleeve 52. All of the rollers of the individual sets, which duplicate each other, are of elongated form, having a relatively small diameter, and may, for example, be of the type frequently referred to commercially as needle bearings. The individual bearing rollers are freely received in the space between the associated bearing surfaces, with the lateral surfaces of the adjacent rollers in freely abutting relation to each other. Slight end play of the individual rollers is preferably permitted. The end play of the rollers 50 is limited by a collar 70 carried by the hanger 44 and by a radial enlargement 72, which projects outwardly from the sleeve 42. A corresponding limit to axial play of the rollers 58 is afforded by the enlargement 72 and by the flange 74 at the inner end of the sleeve 42. As will be evident from the drawing, the flange 76, enlargement 78 and collar 80 correspondingly limit axial play of the sets of rollers 60 and 62. The just-described construction also minimizes any tendency of the rollers to become cocked and thus insures a free running action.

The foregoing bearing arrangement will be recognized as affording an exceedingly efficient rotatable bearing between the spindle assemblies 38 and the supporting structure, which bearing is readily able to withstand the relatively heavy pressures which must be applied between the electrodes 20 and 22 and the tubing during the course of operation of the machine.

It will be appreciated that the principal loads on the electrode bearings are radial loads. It is, however, preferred to provide the present spindle assembly with the tapered roller bearing 82 to sustain any thrust loads thereon. As will be evident from the drawing, the bearing assembly 82 is received between the reduced end 84 of the spindle 38 and the housing member 86, which is secured to the rear face of the hanger 46. The outer races of the bearing element 82 are seated between a shoulder 88 in the housing 86 and a retainer 90, which is threaded into the outer open end thereof. Similarly, the inner races of the bearing element 82 are received between a shoulder 92 formed on the reduced portion 84 of the spindle and a nut 94, which is threaded onto the outer end of the spindle.

The upper lateral marginal edges of the hangers 44 and 46 are provided with flanges 100 and 102, which are received in ways 104 and 106 provided therefor on the previously identified frame structure 48. Suitable means, illustrated as comprising the screw 108, are connected between the hangers and the frame 48 so as to enable the entire head to be adjusted transversely of the path of movement of the work.

In the present instance, current for the electrodes 20 and 22 is supplied by means of a transformer 110, which may be of usual construction and the frame of which is mounted directly upon but insulated from the hangers 44 and 46. The secondary leads 112 and 114 of the transformer 110 are in direct electrical contact with the hangers 44 and 46, respectively, it being noted that these hangers are insulated from each other by means of an insulating member 116.

It will further be noted from previous description that one secondary terminal 112 of the transformer is in direct electrical communication with the electrode 22 through the hanger 44, the roller bearings 56, 58, and the sleeve 42, and the bushing 34. The other lead 114 of the transformer secondary winding, in turn, is in direct electrical contact with the electrode 20 through the hanger 46, the bearings 60 and 62, the spindle portions 64 and 37, and the bushing 36. The just-mentioned two circuits, in turn, are completely insulated from each other by means of the insulating members 116, 54, 77, 40 and 32. It will further be observed that the present invention, by employing the rotatable bearings between the hangers 44 and 46 and the spindle structure to transmit current between the transformer and the electrodes, entirely dispenses with the need for brush assemblies or other current transmitting means, thus not only eliminating such additional apparatus, but affording an extremely efficient current conducting path.

In the illustrated arrangement, the frame structure 48 is carried at the upper end of vertically adjustable columns 120, four of which may be employed and positioned at the respective corners of the frame. The columns 120 are received in cooperating supports 122 and means may be and preferably are provided, comprising the hand wheel 124, which may be operated to raise and lower the columns 120 relative to the support, so as to provide a vertical adjustment of the welding head as a whole.

Any suitable means may be provided for supporting the previously mentioned lower forming rolls 26 and 28. In the present instance, these rolls 26 and 28 are secured at the upper ends of spindles 126, which are rotatably supported in sleeves 128. The sleeves 128 are threaded into openings provided therefor in a supporting block 130, and may be individually rotated so as to raise and lower the corresponding rollers 26 or 28. In addition, the block 130 is received in a supporting frame 132, and suitable adjusting means comprising the screw 134. The screw 134 is interposed between the frame 132 and the block 130, so as to admit of a transverse adjustment of the rollers 26 and 28. It will be understood that a rotation of the screw 134 causes a relative adjustment of the rolls 26 and 28, causing them to move apart or toward each other. A simultaneous adjustment of both rolls 26 and 28 is, in turn, afforded by adjusting the sleeve 136, which receives the screw 134, which simultaneous adjustment moves the entire roll assembly one way or the other with respect to the seam.

While only a single, specific embodiment of the invention has been described in detail, it will be appreciated that various modifications in the form, number, and arrangement of parts may be made therein without departing from the spirit and scope of the invention.

What is claimed is:

1. In electric welding apparatus, a welding head comprising a roller electrode formed of two adjacent but electrically separate electrode elements, a spindle assembly for supporting said electrodes and conducting current thereto having a spindle portion and a sleeve fitted thereon but insulated therefrom, means electrically connecting one said electrode element to said sleeve and electrically connecting the other said electrode element to said spindle portion, means comprising a pair of electrically separate hangers for rotatably supporting said spindle assembly, said hangers being adapted for electrical connection to the respective terminals of a source of current supply, and means comprising a plurality of roller bearing elements interposed between said hangers and said spindle assembly, said bearing elements acting to form radial bearings between said hangers and said spindle assembly and to conduct current between one of said hangers and said spindle portion and between the other hanger and said sleeve.

2. In electric welding apparatus, a welding head comprising a roller electrode formed of two adjacent but electrically separate electrode elements, a spindle assembly for supporting said electrodes and conducting current thereto having a spindle portion and a sleeve fitted thereon but insulated therefrom, means electrically connecting one said electrode element to said sleeve and electrically connecting the other said electrode element to said spindle portion, means comprising a pair of electrically separate hangers for rotatably supporting said spindle assembly, said hangers being adapted for electrical connection to the respective terminals of a source of current supply, a first roller bearing assembly interposed between one said hanger and said sleeve, and a second roller bearing assembly interposed between said other hanger and said spindle portion, said roller bearing assemblies forming radial bearings between said hangers and said spindle assembly and acting to conduct current through said bearings.

3. In electric welding apparatus, a welding head comprising a roller electrode formed of two adjacent but electrically separate electrode elements, a spindle assembly for supporting said electrodes and conducting current thereto having a spindle portion and a sleeve fitted thereon but insulated therefrom, means electrically connecting one said electrode element to said sleeve and electrically connecting the other said electrode element to said spindle portion, means comprising a pair of electrically separate hangers for rotatably supporting said spindle assembly, said hangers being adapted for electrical connection to the respective terminals of a source of current supply, a first roller bearing assembly interposed between one said hanger and said sleeve, and a second roller bearing assembly interposed between said other hanger and said spindle portion, said roller bearing assemblies forming radial bearings between said hangers and said spindle assembly and acting to conduct current through said bearings, each said roller bearing assembly comprising a plurality of circumferentially distributed rollers each of a length considerably in excess of their diameter.

4. In electric welding apparatus, a welding head comprising a roller electrode formed of two adjacent but electrically separate electrode elements, a spindle assembly for supporting said electrodes and conducting current thereto having a spindle portion and a sleeve fitted thereon but insulated therefrom, means electrically connecting one said electrode element to said sleeve and electrically connecting the other said electrode element to said spindle portion, means comprising a pair of electrically separate hangers for rotatably supporting said spindle assembly, said hangers being adapted for electrical connection to the respective terminals of a source of current supply, a first roller bearing assembly interposed between one said hanger and said sleeve, a second roller bearing assembly interposed between said other hanger and said spindle portion, said roller bearing assemblies forming radial bearings between said hangers and said spindle assembly and acting to conduct current through said bearings, each said bearing assembly comprising two similar axially spaced sets of circumferentially distributed elongated rollers, and having means cooperating with the individual rollers to limit axial movement thereof within the bearing.

5. In welding apparatus, a pair of disc-like peripherally grooved electrode elements arranged in back-to-back but insulated relation so as to define a welding throat therebetween, a spindle assembly for rotatably supporting said elements comprising a bearing portion and a reduced portion, a sleeve fitted onto but insulated from said reduced portion and having a bearing portion, means securing said electrode elements on said spindle with one element electrically connected to said reduced end portion and the other element electrically connected to said sleeve, and hanger means forming spaced relatively insulated bearing portions for respectively receiving the bearing portions of said spindle and the said sleeve.

6. In current controlling apparatus, the combination of first and second relatively rotatable members, means including a series of circumferentially arranged elongated roller bearing elements interposed between said members and forming a radial bearing therebetween, said rollers being cylindrical so that axial thrust loads between said members do not materially affect the radial forces acting between said members and said rollers, and means for passing electrical current through said elements from one said member to the other.

7. In current controlling apparatus, the combination of a rotatable spindle, a support for said spindle having a bearing portion to receive the spindle, means including a roller bearing unit of the cageless type comprising a plurality of elongated rollers interposed between said bearing portion and said spindle and forming a radial bearing therebetween, said rollers being cylindrical so that axial thrust loads between said members do not materially affect the radial forces acting between said members and said rollers, and means for passing electrical current through said cageless roller bearing between said spindle and said support.

8. In current controlling apparatus, the combination of a rotatable spindle, a support for said spindle having a bearing portion to receive the spindle, means including a roller bearing unit of the cageless type interposed between said bearing portion and said spindle and forming a radial bearing therebetween, and means for passing electrical current through said cageless roller bearing between said spindle and said support, said bearing unit comprising a plurality of axially spaced similar sets of circumferentially distributed elongated rollers, said rollers being cylindrical so that axial thrust loads between said members do not materially affect the radial forces acting between said members and said rollers.

9. In current controlling apparatus, the combination of a rotatable spindle, a support for said spindle having a bearing portion to receive the spindle, means including a roller bearing unit of the cageless type interposed between said bearing portion and said spindle and forming a radial bearing therebetween, means for passing electrical current through said cageless roller bearing between said spindle and said support, said bearing unit comprising a plurality of axially spaced similar sets of circumferentially distributed elongated rollers, said rollers being cylindrical so that axial thrust loads between said members do not materially affect the radial forces acting between said members and said rollers, and means positioned between successive said sets of rollers for limiting axial play thereof.

ARTHUR B. WILLSEY.